(12) United States Patent
Kato et al.

(10) Patent No.: US 7,987,037 B2
(45) Date of Patent: Jul. 26, 2011

(54) VEHICLE MOTION CONTROL APPARATUS

(75) Inventors: Toshihisa Kato, Handa (JP); Toshio Yasutake, Nagoya (JP); Atsushi Ikematsu, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 601 days.

(21) Appl. No.: 12/073,862

(22) Filed: Mar. 11, 2008

(65) Prior Publication Data

US 2008/0300764 A1 Dec. 4, 2008

(30) Foreign Application Priority Data

Mar. 15, 2007 (JP) .................................. 2007-066754
Dec. 10, 2007 (JP) .................................. 2007-318418

(51) Int. Cl.
*G05D 1/00* (2006.01)
*B60T 7/12* (2006.01)
*G06F 7/70* (2006.01)
*G06G 7/00* (2006.01)
*G06G 7/76* (2006.01)

(52) U.S. Cl. .......................................... 701/75; 701/70

(58) Field of Classification Search ..................... 701/70, 701/75

See application file for complete search history.

(56) References Cited

U.S. PATENT DOCUMENTS

| 6,132,014 | A  | * | 10/2000 | Kiso et al. ..................... 303/146 |
| 2003/0074123 | A1 | * | 4/2003 | Kin et al. ......................... 701/70 |
| 2005/0012388 | A1 | * | 1/2005 | Kato et al. ..................... 303/146 |
| 2005/0096826 | A1 | * | 5/2005 | Iwasaka et al. ................. 701/70 |
| 2007/0067085 | A1 | * | 3/2007 | Lu et al. ........................... 701/70 |

FOREIGN PATENT DOCUMENTS

JP  11-227586 A  8/1999

* cited by examiner

*Primary Examiner* — Tuan C To
*Assistant Examiner* — Imran Mustafa
(74) *Attorney, Agent, or Firm* — Buchanan Ingersoll & Rooney PC

(57) ABSTRACT

A vehicle motion control apparatus includes a first means applying a first braking force to an outer wheel, relative to a turning direction, for suppressing oversteer when the vehicle is judged to be skidding in vehicle turning movement, a second means obtaining a state of a driver's steering operation in the vehicle turning movement, a third means applying a second braking force, set to be smaller than the first braking force, to a wheel located at a horizontally opposite side of the outer wheel to which the first braking force is applied, when the state of the driver's steering operation is judged to be in a steering turning back state, in which a steering wheel is turned from a turning direction to a reverse direction of the turning direction, based on the state of the driver's steering operation obtained by the second means.

20 Claims, 9 Drawing Sheets

VEHICLE MOTION CONTROL APPARATUS

CROSS REFERENCE TO RELATED APPLICATIONS

This application is based on and claims priority under 35 U.S.C §119 with respect to Japanese Patent Application 2007-066754, filed on Mar. 15, 2007 and Japanese Patent Application 2007-318418, filed on Dec. 10, 2007, the entire content of which is incorporated herein by reference.

FIELD OF THE INVENTION

The invention relates to a vehicle motion control apparatus which controls vehicle motion by controlling the brake fluid pressure.

BACKGROUND

A known vehicle motion control apparatus is disclosed in JP11-227586A. When an operation such as lane changing is conducted rapidly to avoid a certain danger, the motion control apparatus calculates a deviation between a target yaw rate, which is calculated based on a steering angle determined by the steering operation of the driver, and an actual yaw rate, which is detected based on the yaw rate sensor. Then, the motion control apparatus determines a state of a vehicle skid based on the deviation. In case that a skid occurs, a pump supplies the brake fluid for applying a braking force to outer wheels relative to the turning direction, i.e. the wheels to be controlled (hereinafter, referred to as the controlled wheel). Thus, the braking force is applied independently from the brake operation of the driver.

After turning the steering wheel back in a reverse direction during the lane changing, a large skid may occur while the vehicle is turning in the reverse direction.

In order to improve the responsiveness of the braking force applied to the wheels for suppressing the large skid which may occur after turning the steering wheel back, the motion control apparatus applies a pressure preload to a front wheel, which is located at a horizontally opposite side of the outer wheels, i.e. the controlled wheel, to eliminate a clearance around the wheel cylinder.

However, in the preload operated by the motion control apparatus disclosed in JP 11-227586A, the fluid pressure, which is not large enough to generate the braking force for the wheel, is provided as the preload. Thus, after turning the steering wheel back in the reverse direction, the occurrence of the skid is not suppressed.

A need exists for a vehicle motion control apparatus which suppresses an occurrence of a skid in a direction that a steering wheel is turned back, when the steering wheel is turned back in lane changing.

SUMMARY OF THE INVENTION

According to an aspect of the present invention, a vehicle motion control apparatus includes a first means applying a first braking force to an outer wheel, relative to a turning direction of a vehicle, for suppressing oversteer when the vehicle is judged to be skidding in vehicle turning movement, a second means obtaining a state of a driver's steering operation in the vehicle turning movement, a third means applying a second braking force, set to be smaller than the first braking force applied by the first means, to a wheel located at a horizontally opposite side of the outer wheel to which the first braking force is applied, when the state of the driver's steering operation is judged to be in a steering turning back state, in which a steering wheel is turned from a turning direction to a reverse direction of the turning direction, based on the state of the driver's steering operation obtained by the second means.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
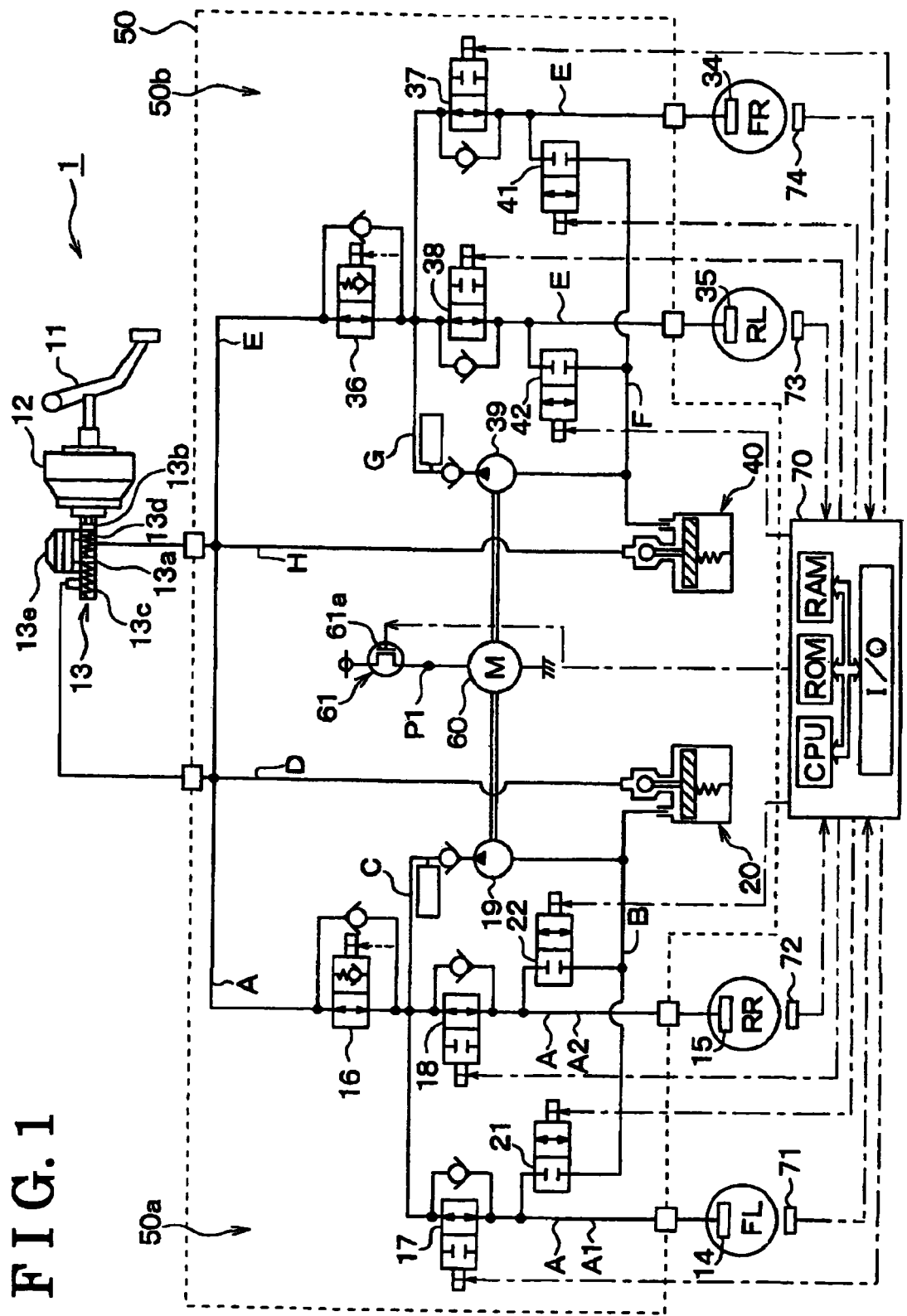
FIG. 1 is a view showing an entire structure of a brake control system achieving vehicle motion control in a first embodiment of the invention.

Hereinafter, plural embodiments of the present invention will be described with reference to the attached drawings. In the respective embodiment, the same reference numerals are used in the drawings to represent identical or equivalent elements.

FIRST EMBODIMENT

A first embodiment of the invention will be described here. FIG. 1 illustrates an entire configuration of a vehicle brake control system 1 for achieving vehicle motion control according to the first embodiment of the invention. The vehicle brake control system 1 performs electronic stability control (hereinafter referred to as ESC) as a vehicle motion control.

In FIG. 1, when a driver depresses the brake pedal 11, the depression force is boosted by a booster 12, and master pistons 13a and 13b provided in a M/C 13 are pressed by the boosted depression force. Accordingly, equal M/C pressure is generated in each of a primary chamber 13c and a secondary chamber 13d, both of which are defined in the M/C 13 by means of master pistons 13a and 13b. The M/C pressure is applied to each of W/Cs 14, 15, 34 and 35 through a brake fluid pressure controlling actuator 50.

Here, the M/C 13 is provided with a master reservoir 13e having passages for communicating with the primary chamber 13c and the secondary chamber 13d.

The brake fluid pressure controlling actuator 50 includes a first brake circuit 50a and a second brake circuit 50b. The first brake circuit 50a controls the brake fluid pressure for a front-left wheel FL and a rear-right wheel RR and the second brake circuit 50*b* controls the brake fluid pressure for a front-right wheel FR and a rear-left wheel RL.

Since the second brake circuit 50*b* has a configuration identical to the first brake circuit 50*a*, only the first brake circuit 50*a* will be described and the description of the second brake circuit 50*b* will be omitted.

The first brake circuit 50*a* is provided with a conduit A serving as a main conduit for transmitting the M/C pressure to the W/C 14 for the front-left wheel FL and the W/C 15 for the rear-right wheel RR.

Further, the conduit A is provided with a first pressure difference control valve 16 which is controlled to be in a fluid communicating state, in a pressure difference generating state or in a fluid communication interrupting state. Specifically, when the first pressure difference control valve 16 is in the fluid communicating state, flow of the brake fluid in the conduit A is established, or fluid communication is established between the M/C 13 and the W/Cs 14 and 15. When the first pressure difference control valve 16 is in the pressure difference generating state, the pressure difference is generated between the M/C pressure and the W/C pressure of each of the W/Cs 14 and 15. When the first pressure difference control valve 16 is in the fluid communication interrupting state, the flow of the brake fluid in the conduit A is interrupted by closing the first pressure difference control valve 16, or the fluid communication is interrupted between the M/C 13 and the W/Cs 14 and 15 by the first pressure difference control valve 16. The pressure difference control valve 16 is a normally opened linear solenoid valve, and the commanded current, which has a predetermined relationship with a desired commanded pressure difference, is flowed thereinto for adjusting the actual pressure difference between the master cylinder 13 and the corresponding wheel cylinder(s) 14 and 15 in accordance with the commanded target pressure. When the commanded target pressure is larger than the actual pressure difference, the current is flowed into the pressure difference control valve 16 to move the valve 16 in a closing direction for the amount corresponding to the commanded current, thereby increasing the actual pressure difference to reach the commanded target pressure. On the other hand, when the commanded target pressure is smaller than the actual pressure difference, the current is flowed into the valve 16 to move the valve 16 in an opening direction for the amount corresponding to the commanded current, thereby decreasing the actual pressure difference to reach the commanded target pressure. The openings or closures of the first pressure difference control valve 16 is adjusted so as to be in the fluid communicating state at the time of the normal brake operation in which a driver operates a brake pedal 11 (the motion control is not conducted). When the current flows into a solenoid coil provided at the first pressure difference control valve 16, the openings or closures of the first pressure difference control valve is adjusted to generate the pressure difference. In the case, the larger the amount of the current flowed into the solenoid coil becomes, the larger the pressure difference becomes.

When the first pressure difference control valve 16 is in the pressure difference generating state, only if the brake fluid pressure of the W/C 14 and 15 becomes higher than the M/C pressure by a predetermined pressure, the brake fluid is allowed to flow from the W/Cs 14 and 15 toward the M/C 13. Thus, the brake fluid pressures at the sides of the W/C 14 and 15 are constantly maintained at a level lower than that of the M/C 13 side by the predetermined pressure.

The conduit A branches to a conduit A1 and a conduit A2 at the sides of W/C 14 and 15 which are located downstream of the first pressure difference control valve 16. The conduit A1 is provided with a first pressure increasing control valve 17 for controlling the increase in the brake fluid pressure applied to the W/C 14, and the conduit A2 is provided with a second pressure increasing control valve 18 for controlling the increase in the brake fluid pressure applied to the W/C 15.

The first and second pressure increasing control valves 17 and 18 are respectively comprised of a two-position solenoid valve which is switched from the fluid communicating state and the fluid communication interrupting state.

The first and second pressure increasing control valves 17 and 18 are normally open type valves. When no control current flows into the solenoid coils provided at the first and second pressure increasing control valves 17 and 18 (non energized state), each valve is in the fluid communicating state. On the other hand, when the control current flows into the solenoid coils (energized state), each valve is controlled to be in the fluid communication interrupting state.

A first pressure decreasing control valve 21 and a second pressure decreasing control valve 22 are disposed at a conduit B, which connects a portion of the conduit A1 between the first pressure increasing control valve 17 and the W/C 14 to the pressure regulation reservoir 20 and also connects a portion of the conduit A2 between the second pressure increasing control valve 18 and the W/C 15 to the pressure regulation reservoir 20. The conduit B functions as a pressure decreasing conduit. Each of the first and second pressure decreasing control valves 21 and 22 is comprised of a two position solenoid valve which is switched from the fluid communicating state and the fluid communication interrupting state. Further, the first and second pressure decreasing control valves 21 and 22 are normally closed type valves.

A conduit C serving as a reflux conduit is provided so as to connect the conduit A serving as the main conduit to the pressure regulation reservoir 20. At the conduit C, a self-suction pump 19 driven by a motor 60 is provided. The brake fluid is suctioned/discharged from the pressure regulation reservoir 20 toward the M/C 13 or the W/Cs 14 and 15 by the pump 19. The voltage supply to the motor 60 is controlled by switching on/off a semiconductor switch 61*a* provided at a motor relay 61.

Further, a conduit D serving as an auxiliary conduit is provided between the pressure regulation reservoir 20 and the M/C 13. The pump 19 suctions the brake fluid from the M/C 13 through the conduit D and discharges the brake fluid to the conduit A, thereby supplying the brake fluid toward the W/Cs 14 and 15 to increase the W/C pressure of each controlled wheel at the time of the motion control such as ESC or Traction control (TCS).

Figure 2:
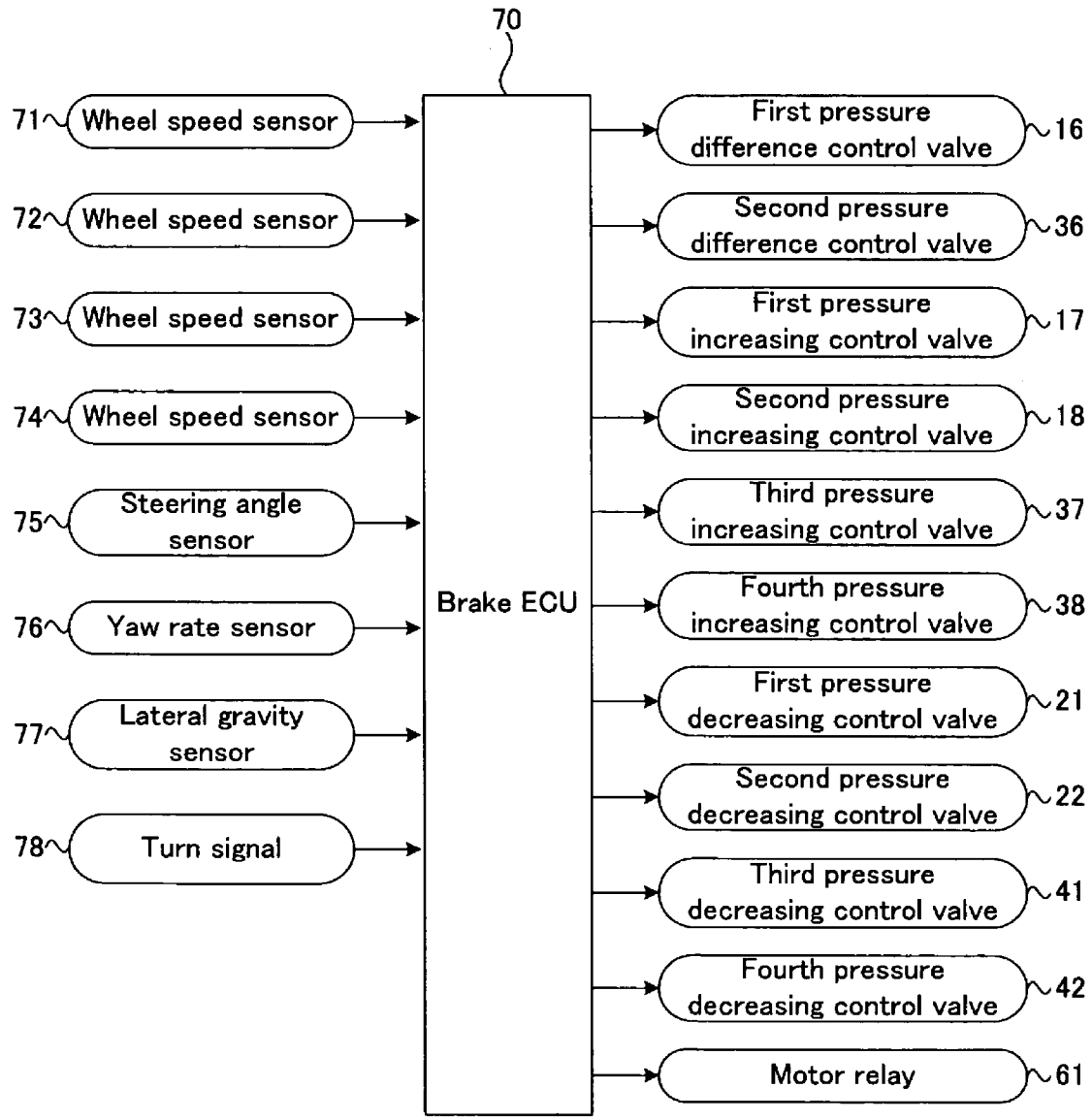
FIG. 2 is a block diagram showing a relationship between input and output signals of a brake ECU.

The brake ECU 70 corresponds to a vehicle motion control apparatus which controls the brake control system 1 of the embodiments and is comprised of a known microcomputer having a CPU, a ROM, a RAM, an I/O and the like. The brake ECU 70 executes various processes such as calculation in accordance with instructions programmed in the ROM or the like. FIG. 2 is a block diagram showing a relationship between input and output signals of the brake ECU 70.

As shown in FIG. 2, the brake ECU 70 receives detection signals from wheel speed sensors 71 to 74, which is respectively provided at each wheel FL, RR, RL, FR, a steering angle sensor 75, a yaw rate sensor 76, a lateral acceleration (lateral gravity) sensor 77, and a turn signal 78 to obtain various types of physical values and an operational state of the turn signal 78. For example, the brake ECU 70 obtains the wheel speed of each wheel FL, RR, RL, FR, the vehicle speed (estimated vehicle speed), the steering angle depending on the operation amount of the steering by the driver, an actual yaw rate and the lateral gravity occurring to the vehicle. In accordance with the above-described information, the brake ECU 70 determines whether or not ESC should be operated and further determines which wheel should be controlled under ESC. Furthermore, a control amount, i.e., the W/C pressure applied to the W/C of each controlled wheel is determined on the basis of the information. Then, the brake ECU 70 controls the current supply to the control valves 16, 17, 18, 21, 22, 36, 37, 38, 41 and 42 and the amount of the current flowed into the motor 60 for driving the pumps 19 and 39 based on the results of the above-described processes. As just described, ESC, controlling the W/C pressure generated for the W/Cs 14, 15, 34 and 35, is operated.

For example, when the W/C pressure is to be generated for a controlled wheel, the front-left wheel FL in this case, the first pressure difference control valve 16 is brought into the pressure difference generating state and the motor relay 61 is turned on to drive the pump 19 by means of the motor 60. Thus, the brake fluid pressure becomes higher at the downstream of the first pressure difference control valve 16 (the W/C side) due to the pressure difference generated by the first pressure difference control valve 16. At that point, the second pressure increasing control valve 18 corresponding to a non-controlled wheel, the rear right wheel RR in this case, is brought into the fluid communication interrupting state to prevent the W/C 15 from being pressurized, and the current is controlled (for example, by the duty ratio) or is not flowed into the first pressure increasing control valve 17 corresponding to the controlled wheel, i.e. the front left wheel FL. Further, when the preload control is conducted, the W/C of a front wheel, which is located at a horizontally opposite side of the controlled wheel(s), is preloaded. In this case, in order to preload the W/C 34 of the front right wheel FR, the second pressure difference control valve 36 is brought into the pressure difference generating state, and the current flowing into the third pressure increasing control valve 37 is controlled (for example, by the duty ratio). The above-described operations preload the W/C 34.

The preloading in the preload control may be conducted by adjusting the amount of the pressure difference of the second pressure difference control valve 36 and maintaining the third pressure increasing control valve 37 in the pressure difference generating state. Further, when pressurizing the W/C 34 in this way, the pressurization of the W/C 35 may be prevented by maintaining the fourth pressure increasing control valve 38 into the fluid communication interrupting state.

The brake control system 1 of the embodiment is configured as just described. Next, the operation of the brake control system 1 will be described in detail. In the brake control system 1, not only the normal brake operation but also the operation of Anti Lock Brake System (ABS) and the like may be conducted as the motion control. However, basic operations of these systems are similar to those of the known systems, and therefore operations of the brake control system 1 for ESC only will be described.

Figure 3:
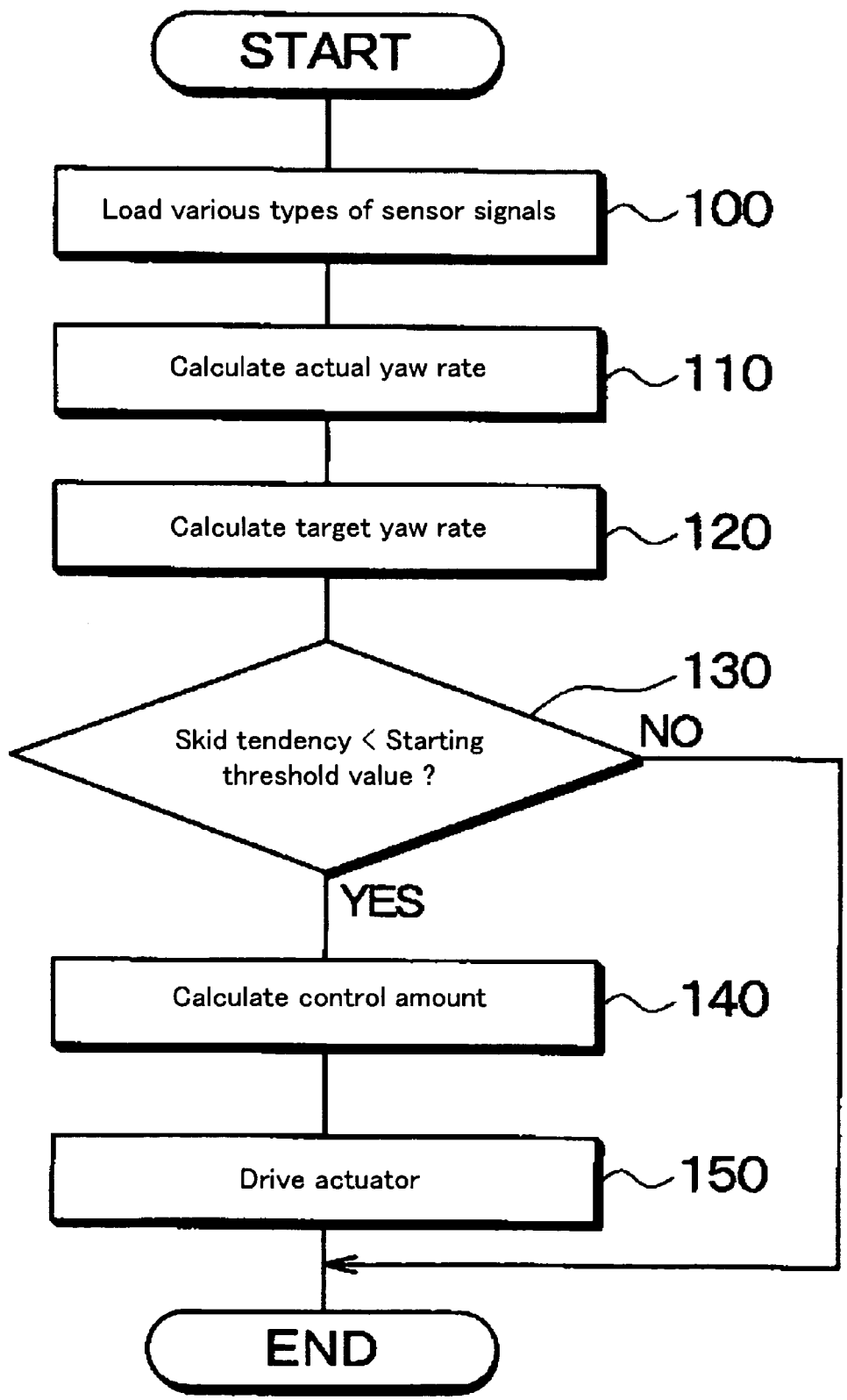
FIG. 3 is a flowchart showing processes of ESC.

FIG. 3 is a flowchart showing steps for ESC, and the steps are executed by the brake ECU 70. ESC is operated at a predetermined operation period when an ignition switch (not shown) provided at the vehicle is turned on, or during operation of the vehicle.

First, the signals of each sensor are loaded in Step 100. More specifically, various types of detection signals and the like, which are necessary for conducting ESC, are loaded from each wheel speed sensor 71, 72, 73, 74, the steering angle sensor 75, the yaw rate sensor 76 and the like, and each physical value is obtained from the loaded data. Accordingly, the wheel speed of each wheel FL, RR, RL, FR, the vehicle speed (estimated vehicle speed) and the steering angle are obtained.

Next, the actual yaw rate occurring at the vehicle, i.e. the actual yaw rate used for judging the initiation condition of ESC control, is obtained. The actual yaw rate is calculated from the detection signal of the yaw rate sensor 76. In addition, the actual yaw rate may be obtained by calculating a difference between the vehicle wheel speeds of the rear-left wheel RL and the rear-right wheel RR, which are driving wheels. For example, in case that the wheel speeds of the rear-left wheel RL and the rear-right wheel RR are represented as VwRL and VwRR respectively and the distance (tread) between the rear-left wheel RL and the rear-right wheel RR is represented as tread r, the actual yaw rate is calculated by dividing the difference between the one wheel speed, VwRL, and the other wheel speed, VwRR, by the tread r.

Meanwhile, the wheel speed VwRL of the rear-left wheel RL is slower than the wheel speed VwRR of the rear-right wheel RR when turning the vehicle to the left and the situation is reversed when turning the vehicle to the right. Thus, the difference obtained by subtracting the wheel speed VwRR from the wheel speed VwRL should be a positive number when turning the vehicle to the left, and the difference should be a negative number when turning the vehicle to the right.

Subsequently, a target yaw rate is calculated in Step 120. Specifically, the target yaw rate is estimated by a known method using the data such as the steering angle determined based on the detection signal of the steering angle sensor 75, the vehicle speed, the lateral gravity determined based on the detection signal of the lateral gravity sensor 77, or the like. Then, an absolute value of the difference between the actual yaw rate obtained in Step 110 and the target yaw rate obtained in Step 120 is determined. The absolute value indicates a skid tendency.

Thereafter, the process proceeds to Step 130 to determine whether the skid tendency exceeds the starting threshold value. Namely, when the skid tendency exceeds the starting threshold value, it is presumed that the vehicle is skidding.

Thus, when the indication of the skid is not appeared and the negative judgment is made in Step 130, the process is terminated. Moreover, when the vehicle is skidding and the affirmative judgment is made in Step 130, further processes will be executed from Step 140. ESC is initiated for suppressing the skid in a way described above. A flag indicating that the vehicle is skidding (hereinafter, referred to as skid flag) is set in conjunction with the initiation of ESC.

In Step 140, the control amount is calculated using the skid tendency obtained in Step 130. The control amount calculation is performed for determining the control amount corresponding to a braking force (first braking force) that should be generated to each controlled wheel for suppressing the skid, i.e. the current amount (for example, duty ratio, i.e. the ratio of the energized time to unit time) that is to be flowed into the control valves 16 to 18, 21, 22, 36 to 38, 41, 42 and the motor 60 in order to generate the target W/C pressure required for the braking force and the like. The control amount (current amount) is determined depending on the skid tendency. For example, the control amount is determined based on a map and a calculation formula, which are pre-stored in the brake ECU 70.

The setting of the controlled wheel(s) is performed based on the driver's intended direction (i.e. right turn or left turn) and whether the vehicle oversteers (hereinafter, referred to as OS state) or understeers (hereinafter, referred to as US state). In order to determine whether the vehicle oversteers or understeers, the target yaw rate and the actual yaw rate are compared, and the steering condition is determined based on which one is larger than the other. For example, when the vehicle oversteers, the rear wheels of the outer and inner wheels, relative to the user's intended direction, are set as the controlled wheels. When the vehicle understeers, the front wheels of the outer and inner wheels, relative to the user's intended direction, are set as the controlled wheels. The braking force is generated to the wheel(s) selected as described above. When selecting the controlled wheel between the front and rear wheels at an outer wheel side or an inner wheel side, the controlled wheel(s) are selected based on the level of the actual yaw rate, the steering angle, and the steering angle speed.

The process proceeds to Step 150 to execute an actuator driving process. The actuator driving process is executed for generating the braking force to each controlled wheel in ESC. The current supply to the control valves 16 to 18, 21, 22, 36 to 38, 41, and 42, and the amount of the current flowed into the motor 60, used for driving the pumps 19 and 39, are controlled in this step. Thus, the pressure is automatically supplied to the W/C corresponding to each controlled wheel, out of the W/Cs 14, 15, 34, and 35, thereby generating the braking force for suppressing the skid.

Figure 4:
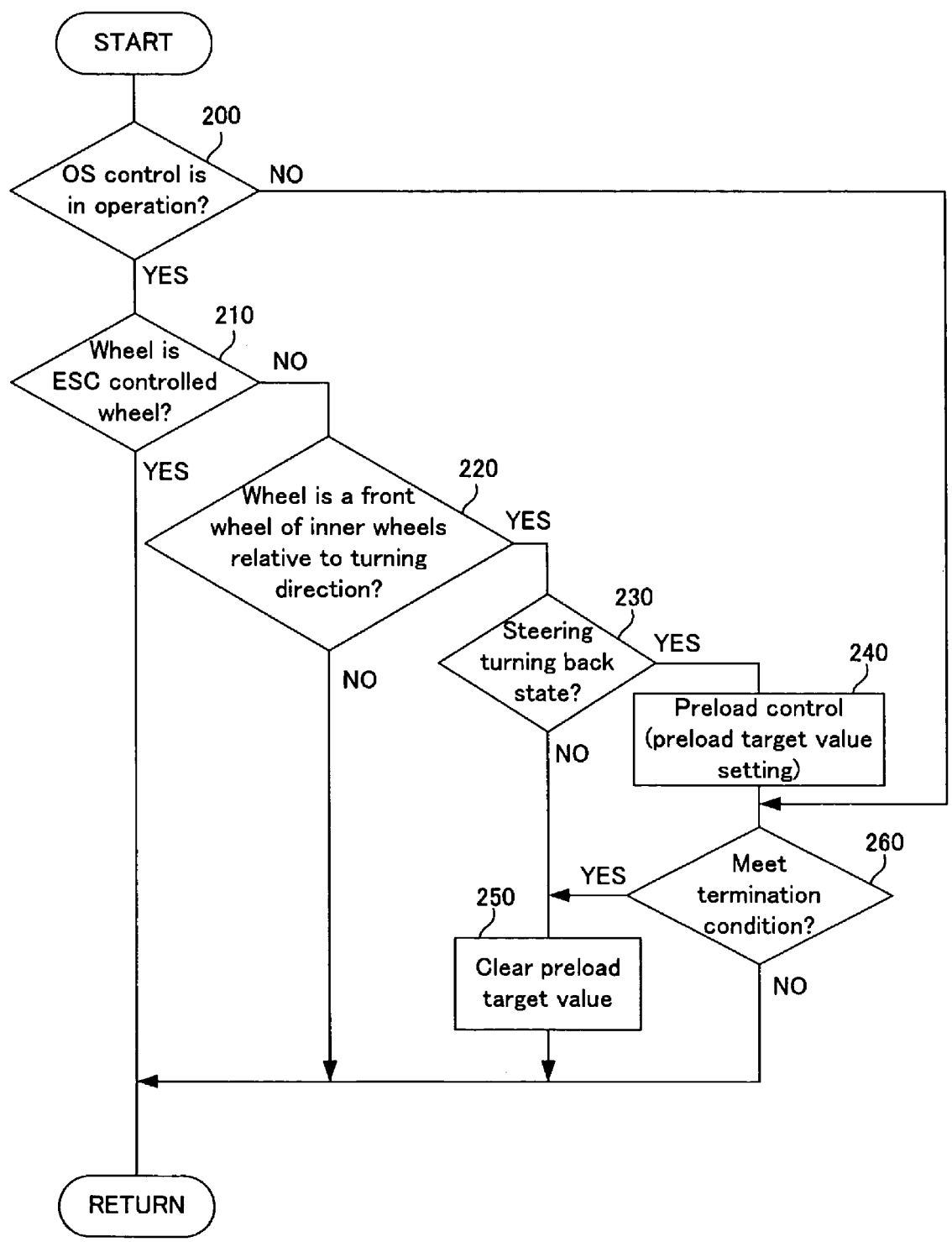
FIG. 4 is a flowchart showing processes of a preload control.
Figure 5:
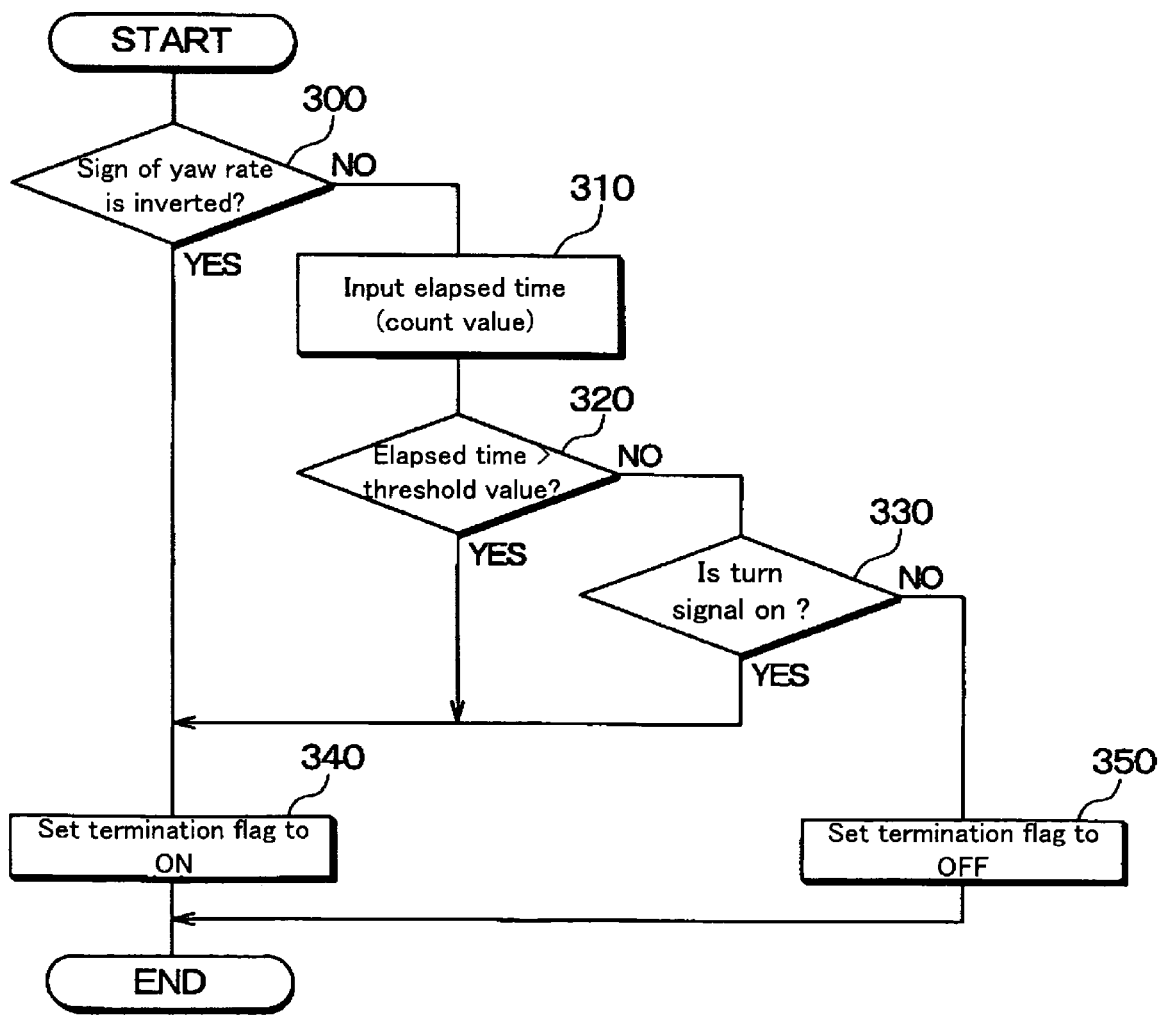
FIG. 5 is a flowchart showing processes of a termination judging process.

Next, a preload control process, executed when the initiation conditions of ESC are satisfied in the above-described ESC processes, and a termination judging process of the preload control will be described. FIG. 4 is a flowchart showing steps of the preload control process, and FIG. 5 is a flowchart showing steps of the termination judging process. The preload control process and the termination judging process will be individually executed for each wheel FL, FR, RL, RR.

Firstly, in Step 200 of FIG. 4, whether ESC is conducted in the OS state, (hereinafter, referred to as OS control) or in a non-OS state, i.e. the US state, (hereinafter, referred to as US control) is judged. When setting the controlled wheel(s) in ESC, the judgment result is stored. Hence, the judgment may be made based on the stored information.

When the OS control is conducted here, the process proceeds to Step 210 to judge whether or not a wheel with which the preload control is conducted (hereinafter, referred to as preload controlled wheel) is the controlled wheel of ESC. As described above, the preload control should be conducted with the front wheel of the wheels, which is located at the horizontally opposite side of the controlled wheel(s), in other words, the front wheel of the inner wheels relative to the turning direction. Thus, if the wheel is the controlled wheel, it is not necessary to conduct the preload control therewith. Hence, the process will be terminated. When the wheel is not the controlled wheel, the process proceeds to Step 220. Similarly, in Step 220, whether or not the preload controlled wheel is the front wheel of the inner wheels relative to the turning direction of the vehicle is judged. If the preload controlled wheel is not the above-described inner wheel, the process will be terminated. Otherwise, the process proceeds to Step 230.

In Step 230, whether or not the steering wheel is turned back is judged. In the process, whether or not the preload control should be initiated is judged. For example, when a driver perceives an obstruction or the like in front of the vehicle, the driver makes a rapid direction change of the vehicle to the left or right by turning the steering wheel quickly. At the time, due to the autorotation movement, the vehicle changes the traveling direction as if sliding from the driver's intended direction. In response to the movement, the driver turns back the steering wheel in the reverse direction reflexively. As just described, the state of turning the steering wheel rapidly is referred to as a steering turning state, and the state of turning back the steering wheel in the reverse direction after the rapid turn is referred to as a steering turning back state. Turning and turning back of the steering wheel are performed under the circumstances such as lane changing.

In the steering turning state in which the steering wheel is rapidly turned, the autorotation movement of the vehicle is large. Thus, it is necessary to conduct ESC to control the OS state. On the other hand, in the steering turning back state, the vehicle, over-rotated in the steering turning state due to the autorotation movement, is turned back in the reverse direction. This manipulation rapidly changes the traveling direction of the vehicle to the reverse direction of the steering turning state and causes a large autorotation movement of the vehicle in the reverse direction of the steering turning state. Hence, even in the steering turning back state, it is still necessary to conduct ESC to control the OS state. At the time, the direction of the autorotation movement of the vehicle is reversed between the steering turning state and the steering turning back state. In conjunction with the reversal of the movement direction, the controlled wheel(s) is (are) reset to the wheel, which is located at the horizontally opposite side. The change of the steering operation, from the steering turning state to the steering turning back state, occurs rapidly, and the switching of the controlled wheel has to be conducted promptly. Therefore, the preload control is conducted when changing the steering operation from the steering turning state to the steering turning back state.

Meanwhile, in the above-described preload control of the embodiment, a braking force (second braking force) is set so as to increase as a changed amount in the steering operation amount, occurred in changing of the steering operation from the steering turning state to the steering turning back state, increases. Namely, the braking force is controlled to be substantially proportional to the changed amount.

Because, when the vehicle is turning in the reverse direction, the larger the changed amount becomes, the larger an angle of the skid, which may occur in the reverse direction, becomes.

Alternatively, the braking force applied to each wheel may be set so as to increase as a vehicle operation amount (for example, yaw rate), which changes in relation with the vehicle turning movement, increases. In other words, the braking force may be set to be substantially proportional to the operation amount of the vehicle. Thus, whether or not the steering operation is in the steering turning back state may be judged by checking the operation amount of the vehicle, and the preload control is conducted in accordance with the amount of the possible skid.

Obviously, the braking force to be applied to the wheel may be set to increase, as both the changed amount in the steering operation amount and the vehicle operation amount increase. In this case, the vehicle operation amount is checked as well as the changed amount, and the operation for turning back the steering may be judged more accurately. Therefore, the preload control is conducted in accordance with the angle of the possible skid in a more appropriate manner.

Therefore, the braking force to be applied to the vehicle is set so as to increase as the changed amount and/or the operation amount of the vehicle increase(s). Accordingly, the occurrence of the skid is effectively suppressed while turning the vehicle in the reverse direction.

At the time, the braking force to be applied to the wheel is set so as to be smaller than the braking force applied to the wheel in ESC control. Thus, the reduction of the effect of the braking force applied in ESC control is prevented.

For example, in Step 230, whether or not the steering operation is in the steering turning back state is judged from the steering angle obtained from the detection signal of the steering sensor 75 in Step 100. Specifically, whether the turning direction of the steering wheel, i.e. the turning direction of the vehicle, is right or left, the difference of the steering angle per unit time (changed amount) (deg/s) is indicated by a negative value, providing that the steering angle of the steering turning state is indicated by a positive number. The difference of the steering angle per unit time (deg/s) is referred to as a normalized steering angle speed. When the normalized steering angle speed decreases to be smaller than the judging threshold value, for example −400 deg/s, it is presumed that the steering operation is changed to the steering turning back state, and the steering operation is judged to be in the steering turning back state. Namely, when the steering operation is changed from the steering turning state to the steering turning back state, the steering angle decreases rapidly. On the other hand, when simply changing a lane, the steering operation is not changed from the steering turning state to the steering turning back state, and the normalized steering angle speed is maintained to be larger than the judging threshold value. Only if the steering operation is changed from the steering turning state to the steering turning back state, the normalized steering angle speed decreases to be smaller than the judging threshold value. The judgment of the steering turning back state is made in this way, thereby preventing the preload from being conducted for lane changing.

Thus, if the affirmative judgment is made in Step 230, the process proceeds to Step 240. A front wheel, which is located at the horizontally opposite side of the controlled wheel(s), is set as the preload controlled wheel for conducting the preload control, and then the preload control is conducted therewith. For example, the target W/C pressure of the preload controlled wheel is set to a preload target value. At the time, the preload target value is determined depending on the changed amount in the steering operation amount and/or the vehicle operation amount as described above. Here, a case that the preload target value is determined depending on the vehicle operation amount will be described as an example.

Figure 6:
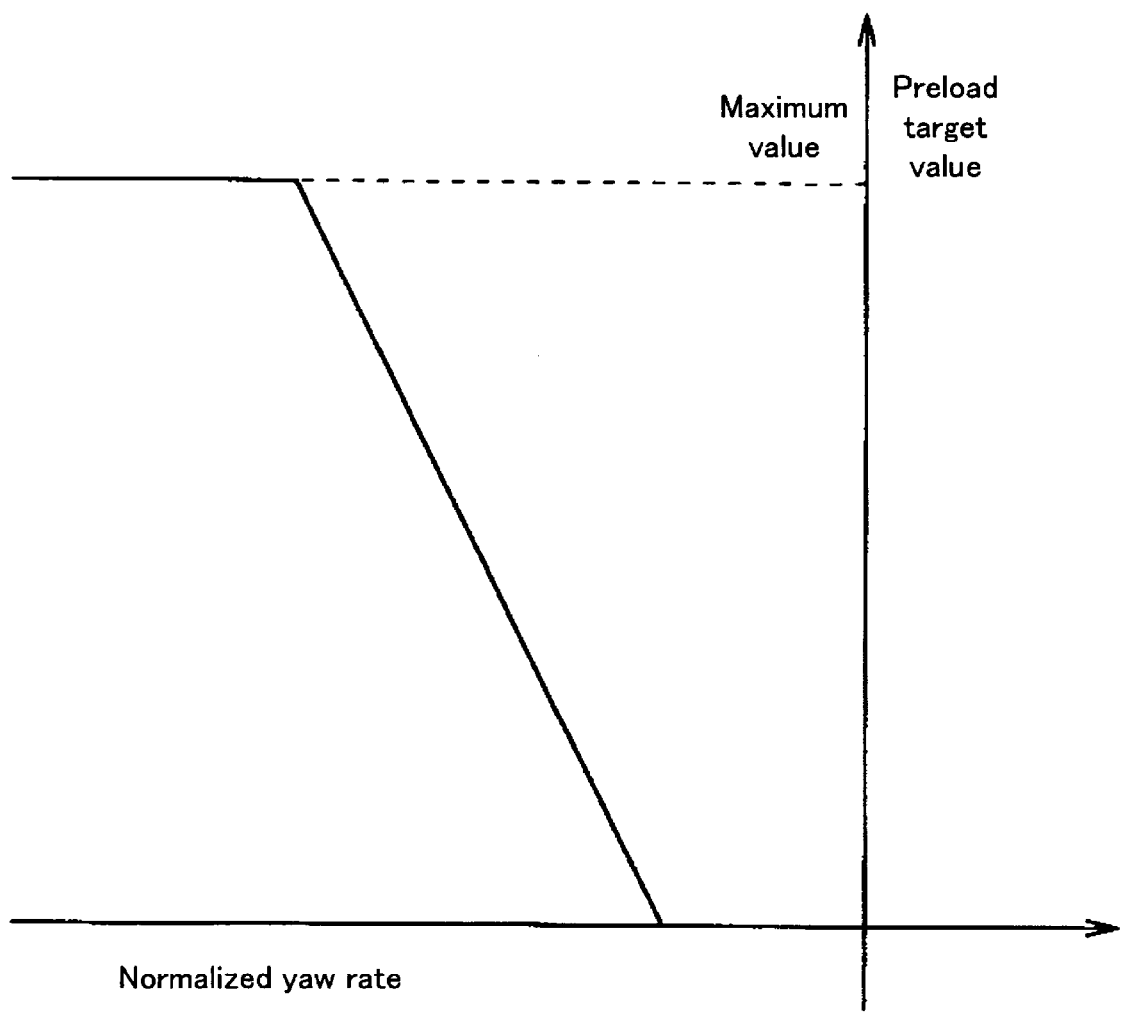
FIG. 6 is a map showing a relationship between an actual yaw rate, which is one of physical amounts indicative of an operation amount of a vehicle, and a preload target value.

FIG. 6 is a map showing a relationship between an actual yaw rate, which is one of the physical amounts indicative of the vehicle operation amount, and the preload target value. However, a sign of the actual yaw rate changes depending on whether the turning direction is left or right, and a normalized yaw rate is defined as an actual yaw rate indicated by a positive value in the steering turning state and indicated by a negative value in the steering turning back state.

As shown in FIG. 6, the preload target value is set so as to increase as an absolute value of the normalized yaw rate increases. However, when the absolute value of the normalized yaw rate exceeds a certain value, the preload target value is set to a maximum value. Further, when the absolute value of the normalized yaw rate is small, it is not necessary to conduct the preload control. Thus, the preload target value is set once the absolute value of the normalized yaw rate reaches a predetermined level.

Meanwhile, the actual yaw rate is obtained in Step 110. Thus, the preload target value is determined by selecting the preload target value corresponding to the normalized yaw rate from the map shown in FIG. 6, or assigning the normalized yaw rate to a relational expression corresponding to the map.

The preload target value is determined as described above, and the preload target value is set as the target W/C pressure. Thus, the pressure difference control valve including the preload controlled wheel, out of the pressure difference control valve 16 of the first brake circuit 50a and the pressure difference control valve 36 of the first brake circuit 50b, is brought into the pressure difference generating state, and the pressure increase controlling valve corresponding to the preload controlled wheel, out of the pressure increase controlling valves 17, 18, 37, 38, is brought into the fluid communicating state. Consequently, the W/C pressure of the preload controlled wheel is increased to reach the preload target value. Further, a time elapsed from an initiation of the application of the braking force is counted in the preload control, and the counting starts concurrently with the initiation of the preload control. The count is conducted, for example, by a counter built into CPU of the brake ECU 70.

Meanwhile, if a negative judgment is made in Step 230, the process proceeds to Step 250. Then, the preload target value of the preload controlled wheel is cleared and the process is terminated.

When the negative judgment is made in Step 200, or the preload control is conducted in Step 240, whether or not the termination conditions are satisfied is judged in Step 260. The termination conditions mean various kinds of conditions used in the termination judging process, which will be described below. Specifically, whether or not each termination condition is satisfied is judged by checking a state of the termination flag, which is set to ON when each termination condition is satisfied in the termination judging process. Details of the termination judging process will be described with reference to FIG. 5.

The termination judging process is executed to judge whether the preload control should be terminated. The termination judging process is executed at a predetermined operation period once ESC is conducted.

Firstly, in Step 300, whether or not the sign of the yaw rate is inverted is judged. The actual yaw rate is calculated from the detection signal of the yaw rate sensor 76 in Step 100 of FIG. 3, or calculated based on the difference between the wheel speeds of the rear-left wheel RL and the rear-right wheel RR. Hence, whether or not the sign of the actual yaw rate is inverted is judged. When conducting the OS control, the vehicle motion is stabilized by the OS control and the OS control becomes unnecessary. Thus, whether the vehicle motion has been stabilized is judged by checking the sign of the actual yaw rate.

Next, in Step 310, a time (count value) elapsed from the initiation of the preload control is input. Then, the process proceeds to Step 320 to judge whether or not the elapsed time exceeds a judging threshold value (a constant time period). As described above, in the preload control, the pressure difference control valve including the preload controlled wheel, out of the pressure difference control valve 16 of the first brake circuit 50a and the pressure difference control valve 36 of the first brake circuit 50b, is brought into the pressure difference generating state and the pressure increase controlling valve corresponding to the preload controlled wheel, out of the pressure increase controlling valves 17, 18, 37, 38, is brought into the fluid communicating state. Consequently, the W/C pressure of the preload controlled wheel is increased to reach the preload target value. At this time, the pump 19 or 39 supplies the brake fluid, thereby gradually increasing the W/C pressure of the preload controlled wheel. However, if the supply of the braking fluid overruns a predetermined amount of time, the W/C pressure of the preload controlled wheel will become too high.

Thus, an increasing gradient of the W/C pressure of the preload control wheel, which is increased by the brake fluid supply of the pump 19 or 39, is determined in advance, and the judging threshold value is set to a value corresponding to the increasing gradient. This setting allows the W/C pressure of the preload controlled wheel to be set as the preload target value and prevents the W/C pressure of the preload controlled wheel from becoming excessively high.

In Step 330, whether or not the turn signal 78 is turned on is judged. When the turn signal 78 is turned on, it is presumed that the lane changing is conducted on the driver's intension. In this case, even if the vehicle is in the steering turning back state, it is not necessary to conduct the preload control.

As just described, the inversion of the yaw rate sign, the elapsed time exceeding the judging threshold value, and the operation of the turn signal 78 are used as the termination conditions and the judgment is made to determine whether each termination condition is satisfied in Steps 300, 320 and 330. When either one of the above-described termination conditions is satisfied, the process proceeds to Step 340 to set the termination flag to ON. When neither of the above-described termination conditions is satisfied, the process proceeds to Step 350 to set the termination flag to OFF.

Thus, the termination judging process is executed to judge whether or not the termination conditions of the preload control are satisfied. When the termination flag is set to ON, the affirmative judgment is made in Step 260 of FIG. 4 and the process proceeds to Step 250. In Step 250, the preload target value of the preload controlled wheel is cleared and the process is terminated.

The operation of ESC and the preload control described above will be described with reference to FIG. 7 which is a timing chart showing the steering angle changed from the steering turning state to the steering turning back state, a flag indicative of the OS control (hereinafter, referred to as OS control flag), a flag indicative of the steering turning back state (hereinafter, referred to as steering turning back flag), the braking force, and the yaw rate. Meanwhile, a case where the vehicle is turned to the left and then turned back to the right direction is shown. In this case, the controlled wheel of the OS control is set to the front-right wheel FR in the steering turning state, the controlled wheel of the OS control is set to the front-left wheel FL, and the preload controlled wheel is set to the front-left FL in the steering turning back state.

Figure 7:
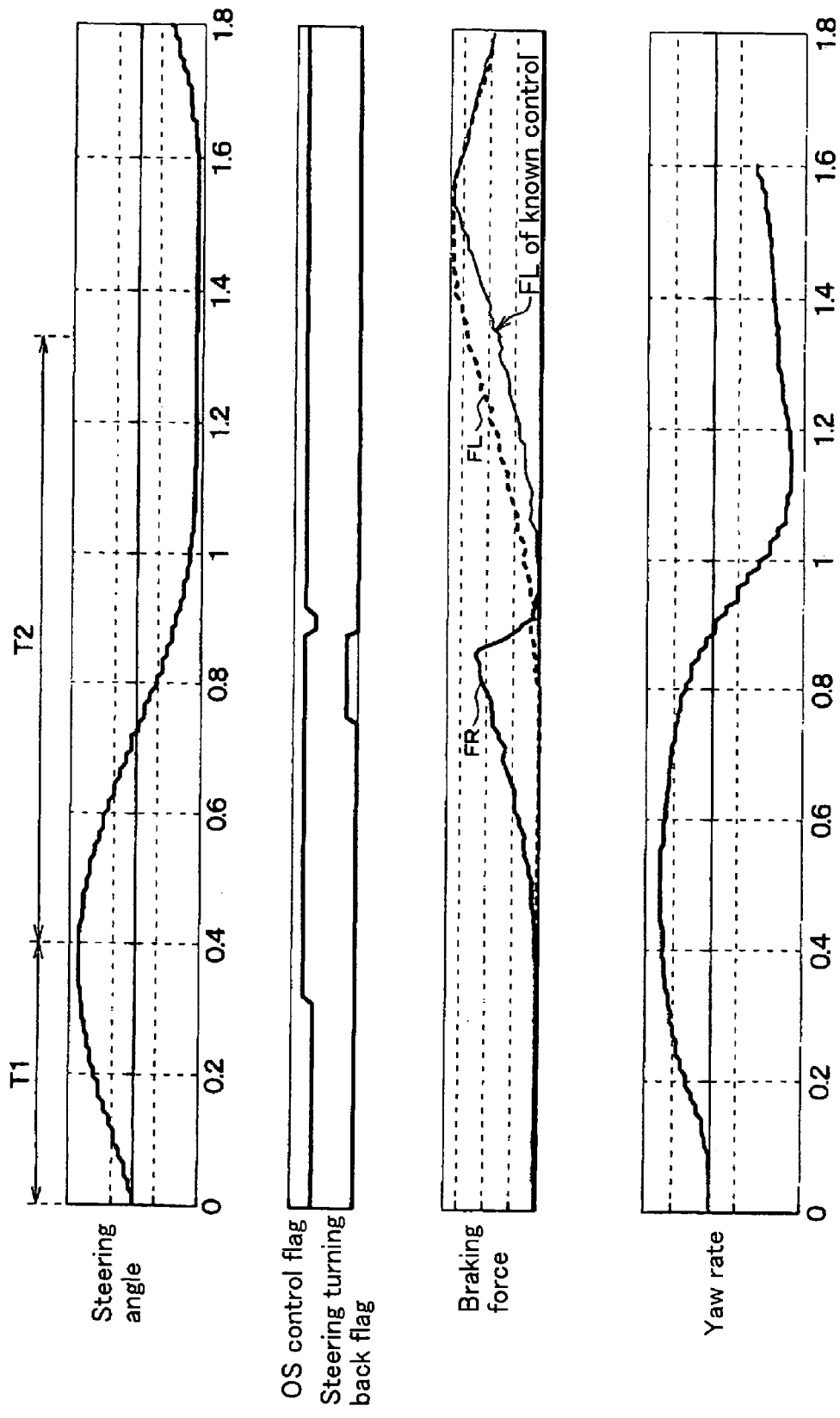
FIG. 7 is a timing chart showing an steering angle, a flag indicative of an OS control, a flag indicative of a steering turning back state, a W/C pressure, a yaw rate in changing a steering operation from a steering turning state to a steering turning back state.

As shown in FIG. 7, when the vehicle is brought into the steering turning state in a time period T1 and then is brought into the steering turning back state in a time period T2, a large yaw rate occurs by turning the vehicle to the left direction in the time period T1. Consequently, the vehicle is brought into the OS state and the OS control flag is set to ON, thereby increasing the braking force for the front right wheel FR, set as the controlled wheel, to conduct the OS control.

Then, the steering angle is rapidly decreased from the maximum value when the steering operation is changed from the steering turning state to the steering turning back state and becomes a negative value. The normalized steering angle speed becomes smaller than the judging threshold value during the decrease of the steering angle, and the steering operation is judged to be in the steering turning back state. Consequently, the steering turning back flag is set to ON, thereby applying the preload to the W/C 14 to generate the braking force for the front-left wheel FL set as the preload controlled wheel.

Thereafter, the steering operation is brought into the steering turning back state, and a large yaw rate occurs in a reverse direction of the steering turning state. Then, the vehicle is brought into the OS state and the OS control flag is set to ON, thereby increasing the braking force for the front-left wheel FL set as the controlled wheel. At the time, the preload is applied to the W/C 14 for the front-left wheel FL, thus generating the larger braking force more promptly than known brake systems. Therefore, the effect of the OS control is enhanced.

As just described, in the embodiment, the circumstance which is likely to cause the steering turning back state is judged and the preload control is conducted. Thus, the preload control may be initiated at a more suitable timing and the braking force is generated to the outer wheel, relative to the turning direction, more promptly in the steering turning back state. Hence, when the vehicle is turning in one direction and then the steering is turned back, the occurrence of the skid in the direction that the steering is turned back is suppressed in advance as well as securing the function for suppressing the skid occurred in the steering turning state.

SECOND EMBODIMENT

A second embodiment of the invention will be described. In the second embodiment, the modification is made to the first embodiment in the judging threshold value for judging the steering turning back state. The other configuration is similar to that of the first embodiment, and thus the description will focus on the portion which is different from the first embodiment.

Figure 8:
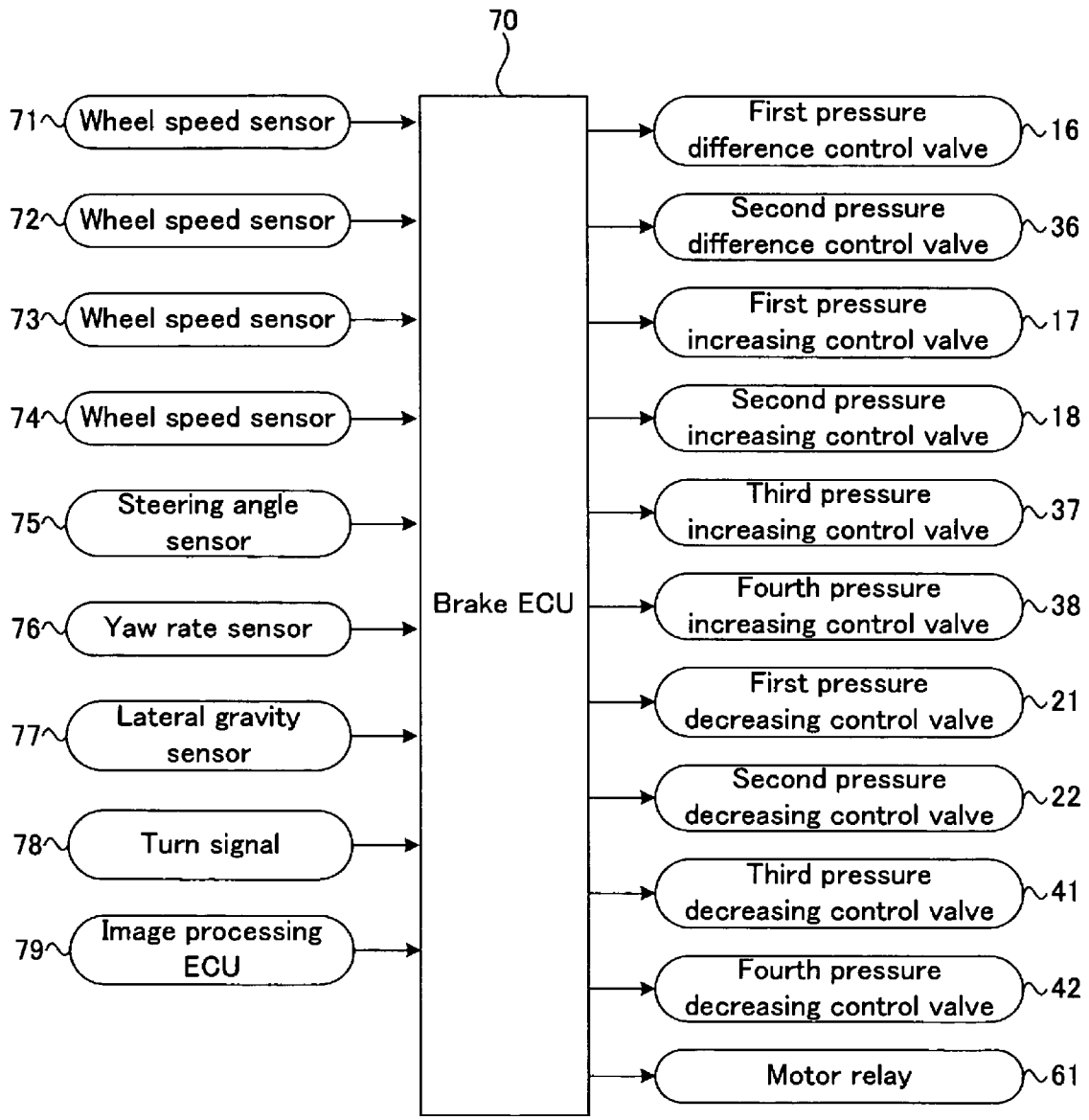
FIG. 8 is a block diagram showing a relationship between input and output signals of a brake ECU provided at a brake control system according to a second embodiment.

FIG. 8 is a block diagram showing a relationship between input and output of signals which are related to the brake ECU 70 provided at a brake controlling system 1 of the embodiment. As shown in FIG. 8, the second embodiment is different from the first embodiment in that a signal indicative of a hazard level is input from an image processing ECU 79 of an on board camera to the brake ECU 70. In the image processing ECU 79, the image data from the on board camera, capturing the images in front of the vehicle, is processed to perceive a human running into the vehicle's path and the presence of the obstruction. Then, the hazard level is set depending on what is present on the vehicle's path after processing the image and is input to the brake ECU 70. The image processing of the image processing ECU 79, the method for perceiving what is present on the vehicle's traveling path, and the setting method of the hazard level are known, thus details are omitted here.

Figure 9:
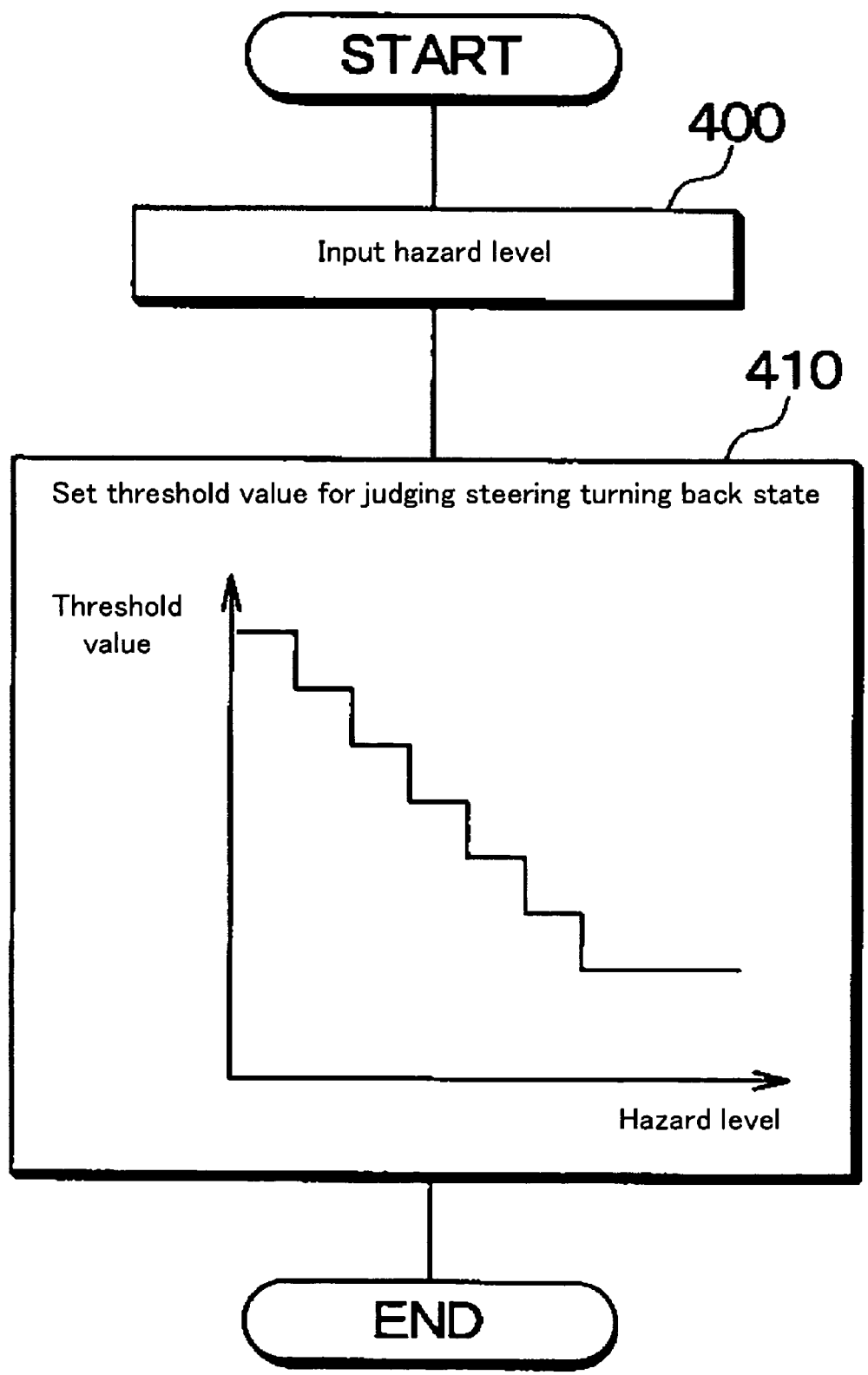
FIG. 9 is a flowchart of a judging threshold value setting process of the steering turning back state.

FIG. 9 is a flowchart of a judging threshold value setting process for judging the steering turning back state, which is executed by the brake ECU 70 of the second embodiment. The process is executed when ESC is initiated at the predetermined operation cycle.

Firstly, in Step 400, the hazard level is input. Specifically, as described above, the brake ECU 70 receives the data indicating the hazard level from the image processing ECU 79.

Then, in Step 410, the judging threshold value is set so as to correspond to the hazard level. The judging threshold value is set so as to be lower, as the hazard level becomes higher. For example, as shown in Step 410, a map, showing a relationship between the hazard level and the judging threshold value, is prestored in the brake ECU 70. The judging threshold value may be set by loading the judging threshold value corresponding to the hazard level from the map.

After setting the judging threshold value for judging the steering turning back state in this way, the set judging threshold value is used in Step 230 of FIG. 4 for judging the steering turning back state. Thus, when the hazard level is high, even if the decrease amount of the normalized steering angle speed is small, compared to when the hazard level is low, the normalized steering angle speed still becomes lower than the judging threshold value. As a result, the steering operation is judged to be in the steering turn back state. For example, when the on-board camera captures that a human runs into the vehicle's traveling path and the hazard level becomes high, the driver is likely to turn the steering to avoid the danger. Accordingly, the judging threshold value for judging the steering turning back state is changed in accordance with the hazard level. This system enables ESC and the preload control emphasizing on security issues.

OTHER EMBODIMENT

In each embodiment described above, one aspect of ESC is described. However, various types of processes may be replaced with well known methods, except the steering turning back process judging process (Step 230 of FIG. 4), which judges whether or not the preload control should be initiated. For example, the target yaw rate and the actual yaw rate, both used for determining to start ESC, may be obtained by other methods.

Further, in the embodiment, an example of the termination conditions of the preload control is described. However, other termination conditions may be set, or a part of the above-described termination conditions may be eliminated to adopt the remaining conditions as the termination condition.

Furthermore, the on-board camera, capturing the human running into the vehicle's traveling path and the presence of the obstruction, is used for inputting the hazard level as an example. However, the input device of the hazard level is not limited to the on-board camera. For example, when the hazard level is perceived by the laser radar, the hazard level may be input to the brake EUC 70.

The respective steps shown in each drawing correspond to means for executing each process.

As just described, whether or not the steering operation is in the steering turning back state is checked in Step 230 (by the third means), when the steering operation is judged to be in the steering turning back state, the preload control is conducted. Thus, the preload control is initiated in the more suitable timing. Consequently, the braking force is applied to the outer wheels, relative to the turning direction of the vehicle, earlier when the vehicle is turned back. Therefore, in case that the steering wheel is turned back in the reverse direction after the vehicle is turned in one direction, the occurrence of the skid in the steering turning back state is suppressed in advance as well as securing the skid suppressing function in the steering turning direction.

For example, the braking force may be set to the value proportional to the changed amount in the steering operation amount per unit time in the changing of the driver's steering operation from the turning direction to the reverse direction of the turning direction in Step 240. Alternatively, the braking force may be set to a value proportional to an operation amount of the vehicle varied by the turning movement of the vehicle.

For example, the steering operation is judged to be in the steering turning back state when the changed amount in the steering operation amount per unit time is lower than the judging threshold value.

In this case, as shown in the second embodiment, the judging threshold value may be varied depending on the hazard level of the vehicle's traveling path. Thus, the preload control is initiated more easily as the hazard level becomes high. Accordingly, this system enables ESC and the preload control emphasizing on security issues.

Further, the actual yaw rate occurring in the vehicle is detected in Step 110, wherein the application of the braking force is terminated when the sign of the actual yaw rate detected in Step 110 is inverted. When the sign of the actual yaw rate is inverted, it is presumed that the vehicle motion is stabilized. Hence, the preload control is terminated.

As described above, the application of the second braking force is terminated when the time elapsed from the initiation of the application of the braking force exceeds the predetermined amount of time.

If the preload control is continued for a long time, the W/C pressure will become too high. Thus, the application of the braking force for the preload control is terminated when the time elapsed from the initiation of the preload control exceeds the predetermined amount of time, thereby preventing the W/C pressure of the preload controlled wheel from becoming too high.

The operation state of the turn signal 78 of the vehicle is detected, and the application of the braking force for the preload control is terminated when the turn signal is in operation.

When the turn signal 78 is in operation, the lane change is conducted on the driver's intension. In this case, even if the vehicle is turned back, it is not necessary to conduct the preload control. Thus, the application of the braking force for the preload is terminated.

The principles, of the preferred embodiments and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A vehicle motion control apparatus, comprising:
a first means for applying a first braking force to at least an outer wheel, relative to a first turning direction of a vehicle, for suppressing oversteer of the vehicle, when the vehicle is determined to be skidding while the vehicle is turning;
a second means for detecting a steering angle in a case where the vehicle turns in the first turning direction;
a steering-turning-state determining means for determining whether or not a steering operation performed by a driver corresponds to a steering-turning state on the basis of changes in the detected steering angle under a condition that the first braking force is acting on at least the outer wheel;
a steering-turning-back state determining means for determining whether or not the steering operation performed by the driver is a steering-turning-back state on the basis of whether or not a sign of a difference of the steering angle per unit time, which is obtained while the first braking force is acting at least on the outer wheel, is opposite to the sign of the difference of the steering angle per unit time in a case where the steering operation performed by the driver is determined to be in the steering-turning state; and
a third means for applying a second braking force, which is set to be smaller than the first braking force applied by the first means, to at least one of the inner wheels, which is located at a position horizontally opposite from the outer wheel to which the first braking force is applied, based upon a determination that the steering operation performed by the driver is the steering-turning-back state.

2. A vehicle motion control apparatus according to claim 1, wherein the third means sets the second braking force to a value proportional to the difference of the steering angle per unit time measured during a change of the driver's steering operation from the steering-turning state to the steering-turning-back state.

3. A vehicle motion control apparatus according to claim 2, wherein the third means sets the second braking force to a value proportional to an operation amount of the vehicle varied depending on the turning of the vehicle.

4. A vehicle motion control apparatus according to claim 3, wherein the steering-turning-back state determining means determines the steering operation to be in the steering turning back state when the difference of the steering angle per unit time is lower than a judging threshold value.

5. A vehicle motion control apparatus according to claim 4, further comprising:
a fourth means for changing the judging threshold value depending on a hazard level of a vehicle's traveling path.

6. A vehicle motion control apparatus according to claim 5, further comprising:
a fifth means for detecting an actual yaw rate occurring in the vehicle, wherein the third means terminates the application of the second braking force when a sign of the actual yaw rate detected by the fifth means is inverted.

7. A vehicle motion control apparatus according to claim 6, wherein the third means terminates the application of the second braking force when a time elapsed from an initiation of the application of the second braking force exceeds a predetermined amount of time.

8. A vehicle motion control apparatus according to claim 7, wherein the third means detects an operation state of a turn signal of the vehicle and terminates the application of the second braking force when the turn signal is in operation.

9. A vehicle motion control apparatus according to claim 5, wherein the third means terminates the application of the second braking force when a time elapsed from an initiation of the application of the second braking force exceeds a predetermined amount of time.

10. A vehicle motion control apparatus according to claim 5, wherein the third means detects an operation state of a turn signal of the vehicle and terminates the application of the second braking force when the turn signal is in operation.

11. A vehicle motion control apparatus according to claim 1, wherein the third means sets the second braking force to a value proportional to the difference of the steering angle per unit time measured during a change of the driver's steering operation from the steering-turning state to the steering-turning-back state, and the steering-turning-back state determining means determines the steering operation to be in the steering turning back state when the difference of the steering angle per unit time is lower than a judging threshold value.

12. A vehicle motion control apparatus according to claim 11, further comprising:
a fourth means for changing the judging threshold value depending on a hazard level of a vehicle's traveling path.

13. A vehicle motion control apparatus according to claim 1, wherein the third means sets the second braking force to a value proportional to an operation amount of the vehicle varied depending on the turning of the vehicle.

14. A vehicle motion control apparatus according to claim 13, wherein the steering-turning-back state determining means determines the steering operation to be in the steering turning back state when the difference of the steering angle per unit time is lower than a judging threshold value.

15. A vehicle motion control apparatus according to claim 14, further comprising:
a fourth means for changing the judging threshold value depending on a hazard level of a vehicle's traveling path.

16. A vehicle motion control apparatus according to claim 1, wherein the steering-turning-back state determining means determines the steering operation to be in the steering turning back state when the difference of the steering angle per unit time is lower than a judging threshold value.

17. A vehicle motion control apparatus according to claim 16, further comprising:
a fourth means for changing the judging threshold value depending on a hazard level of a vehicle's traveling path.

18. A vehicle motion control apparatus according to claim 1, further comprising:
a fifth means for detecting an actual yaw rate occurring in the vehicle, wherein the third means terminates the application of the second braking force when a sign of the actual yaw rate detected by the fifth means is inverted.

19. A vehicle motion control apparatus according to claim 1, wherein the third means terminates the application of the second braking force when a time elapsed from an initiation of the application of the second braking force exceeds a predetermined amount of time.

20. A vehicle motion control apparatus according to claim 1, wherein the third means detects an operation state of a turn signal of the vehicle and terminates the application of the second braking force when the turn signal is in operation.

* * * * *